United States Patent
Tashiro

(10) Patent No.: US 7,793,202 B2
(45) Date of Patent: Sep. 7, 2010

(54) LOSS COMPENSATION DEVICE, LOSS COMPENSATION METHOD AND LOSS COMPENSATION PROGRAM

(75) Inventor: Atsushi Tashiro, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 888 days.

(21) Appl. No.: 11/659,205

(22) PCT Filed: Apr. 7, 2005

(86) PCT No.: PCT/JP2005/006850

§ 371 (c)(1),
(2), (4) Date: Feb. 2, 2007

(87) PCT Pub. No.: WO2006/016439

PCT Pub. Date: Feb. 16, 2006

(65) Prior Publication Data

US 2009/0019343 A1    Jan. 15, 2009

(30) Foreign Application Priority Data

Aug. 12, 2004 (JP) ............................. 2004-235461

(51) Int. Cl.
  *H03M 13/00* (2006.01)
  *G06F 11/08* (2006.01)
  *G08C 25/00* (2006.01)
  *H04L 1/00* (2006.01)
(52) U.S. Cl. ..................................................... 714/799
(58) Field of Classification Search .................. 714/799
    See application file for complete search history.

(56) References Cited

U.S. PATENT DOCUMENTS 4,477,844 A * 10/1984 Nakano et al. ................. 360/8

(Continued)

FOREIGN PATENT DOCUMENTS

JP    05-073097    3/1993

(Continued)

OTHER PUBLICATIONS

Technical Paper of the Telecommunication Standardization Sector of ITU ITU-T Recommendation G.711 Appendix-I (Sep. 1999).

(Continued)

*Primary Examiner*—Guy J Lamarre
(74) *Attorney, Agent, or Firm*—Rabin & Berdo, P.C.

(57) ABSTRACT

It is possible to save storage resources. A loss compensation device for compensating a loss in periodical signals when the loss occurs in an arbitrary section of the periodical signals which are divided into predetermined sections and received in time series, includes: a periodical signal storage which stores one or more sections of newly received periodical signals for a predetermined period of time; a loss detector which detects a loss of each section of the periodical signals; and an element periodical signal generator which generates a plurality of element periodical signals for interpolation having different waveforms, in accordance with the periodical signals stored in the periodical signal storage, at time of detection of the loss if the loss is detected by the loss detector. The plurality of element periodical signals generated by the element periodical signal generator are synthesized, and a result of the synthesizing is arranged at the section where the loss in the periodical signals has occurred.

6 Claims, 10 Drawing Sheets

U.S. PATENT DOCUMENTS 5,751,361 A * 5/1998 Kim ...................... 375/240.12
5,873,058 A * 2/1999 Yajima et al. ................ 704/201
6,128,369 A * 10/2000 Bowker et al. ........... 379/22.03

FOREIGN PATENT DOCUMENTS

| JP | 06-282298 | 10/1994 |
| JP | 07-271391 | 10/1995 |
| JP | 08-305398 | 11/1996 |
| JP | 09-120297 | 5/1997 |
| JP | 2003-249957 | 9/2003 |

OTHER PUBLICATIONS

Technical Paper of the Telecommunication Standardization Sector of ITU ITU-T Recommendation 0.711, (Geneva 1972).

* cited by examiner

LOSS COMPENSATION DEVICE, LOSS COMPENSATION METHOD AND LOSS COMPENSATION PROGRAM

TECHNICAL FIELD

The present invention relates to a loss compensation device, a loss compensation method and a loss compensation program, and is suitable for applying to real-time communication such as voice telephone conversation.

BACKGROUND ART

Currently, voice communication using VoIP technology over a network such as the internet is in common use.

In communication over a network such as the internet, in which communication quality is not assured, because of a packet loss that a packet is lost during transmission, a phenomenon (audio loss) in which part of audio data that should be received in time series is lost, may occur comparatively frequently. When the audio data, in which an audio loss has occurred, is decoded and the decoding result with no changes is output, frequent interruptions of voice and the like occur, thereby impairing voice quality. As a method of compensating the impairment, for example, the art of Non-Patent Document 1 mentioned below has been already known. The encoding method in Non-Patent Document 1 is based on the premise of PCM (pulse modulation) encoding method described in Non-Patent Document 2 mentioned below.

In the art of Non-Patent Document 1, audio encoded data which is an audio signal coded through the use of the PCM encoding method in Non-Patent Document 2 is decoded to obtain a decoded audio signal, and the decoded audio signal (hereinafter, referred to as a "decoding result") is stored in a functioning block (e.g., a memory, etc.) which can store the decoding result. On the other hand, an audio loss is monitored for each audio frame (a frame), which is a unit of the decoding processing, compensation processing is performed every time an audio loss occurs.

The operation of the compensation processing is shown in FIGS. 2A to 2E.

Referring to FIG. 2A, reference symbols F1 to F7 denote frames (i.e., decoded audio signals) which are to be received in time series. In FIG. 2A, the earliest received frame is F1, and other frames sequentially follows as F2, F3, . . . . In an example of FIG. 2A, however, since the three frames F4 to F6 are successively lost as a result of the packet loss, an audio loss is detected in three sections corresponding to these three frames F4 to F6.

FIG. 2B shows the decoding result stored in the memory as a waveform. Since each of T1, T2 and T3 corresponds to one fundamental period, the decoding result of three fundamental periods is stored in the memory. Further, although a length of the fundamental period T is less than one frame of the decoding result in the shown example, the length of the fundamental period T may be longer than one frame of the decoding result.

FIG. 2C shows compensation processing in a section corresponding to the frame F4, FIG. 2D shows compensation processing in a section corresponding to the frame F5, and FIG. 2E shows compensation processing in a section corresponding to the frame F6.

When an audio loss (the first audio loss) in the section corresponding to the frame F4 is detected, as shown in FIG. 2C, interpolation audio data for compensating the audio loss is generated in accordance with the decoding result of one fundamental period, i.e., the decoding result of a section Ta, which was stored in the memory immediately before the frame F4. The section Ta corresponds to the fundamental period T1.

In the one fundamental period, the oldest position B4 of the section Ta is regarded as a beginning position of the interpolation audio data, and the interpolation audio data is generated by obtaining one frame. As shown in the figure, however, if one fundamental period is less than a period of one frame, it is insufficient to obtain one fundamental period of the decoding result S41. Accordingly, returning to the oldest position B4, the decoding result S42 is obtained in order to supplement the insufficiency. Then, the decoding results S41 and S42 are joined to insert into the section corresponding to the frame F4, as interpolation audio data. Processing such as overlapadd or the like is performed in order to make the waveform uninterrupted at the joint of the decoding results S41 and S42.

Subsequent to the detection of the audio loss in the frame F4, if an audio loss is detected also in the section corresponding to the frame F5, in accordance with the decoding results of two fundamental periods of the section Tb, interpolation audio data for compensating audio losses is generated, as shown in FIG. 2D. The section Tb corresponds to the above-mentioned fundamental periods T1 and T2.

In two fundamental periods of the section Tb, a position B5, from which obtaining of interpolation audio data is started, is determined as follows. In general, a position E4 (the right end of S42), at which the decoding result S42 previously obtained in FIG. 2C terminates, is selected as the position B5. However, in a case where the position E4 is not included in the section T2 which is the oldest one fundamental period in the section Tb as shown in the figures, the position B5 is determined by shifting the position E4 by one fundamental period T toward the oldest side until the position E4 enters the section T2. In the shown example, the position B5 is set at the position determined by shifting the position E4 by one fundamental period toward the oldest side.

After the position B5 is thus determined, data S51 and S52 of one frame from the position B5 to the latest side (i.e., to a position E5) are obtained to generate interpolation audio data which is used to be inserted into the section corresponding to the frame F5. In the shown example, the data S52 whose right end is the position E5 is a pert of the section T1.

Subsequent to the detections of the audio losses in the frames F4 and F5, if an audio loss is detected in a section corresponding to the frame F6, in accordance with the decoding results of three fundamental periods of the section Tc, as shown in FIG. 2E, the interpolation audio data for compensating the audio losses is generated. The section Tc corresponds to a combination of the fundamental periods T1, T2 and T3. In FIG. 2E, in the similar manner to FIG. 2D, the position B6, from which obtaining of the interpolation audio data starts, is determined, data S61 and S62 of one frame from the position B6 are obtained to generate the interpolation audio data, which is used to be inserted into the section corresponding to the frame F6.

In the shown example, the position B6 (the left end of S61) corresponds to a position determined by shifting one fundamental period from the position E5 toward the oldest side.

Further, when the audio losses occur successively for a plurality of frames, interpolation audio data is gradually attenuated in or after the second frame (F5 and F6 in FIG. 2). For example, 20% linear attenuation per 10 ms can be adopted. Thereby, it is possible to suppress an abnormal sound such as a beep which may be caused when the same audio data is successively output.

Non-Patent Document 1: ITU-T Recommendation G.711 Appendix I

Non-Patent Document 2: ITU-T Recommendation G.711

DISCLOSURE OF INVENTION

Problems to be Solved by the Invention

In the art of Non-Patent Document 1 described above, however, if the audio losses occur successively for a plurality of frames (e.g., the successive audio losses continue for 60 ms or more), no sound is output during and after a specific period in order to prevent the abnormal sound such as a beep from being caused. For this reason, the audio loss compensation cannot be performed for a long time period, flexibility is lacked, and communication quality in broad sense is low.

Moreover, as shown in FIG. 2B, since it is necessary to provide storage capacity enough to store three fundamental periods of the decoding results, the storage resource such as a memory is consumed and therefore it is used with low efficiency. In actual implementation, as described below, it is usual that storage capacity enough to more than three fundamental periods of the decoding results is required.

Means of Solving the Problem

In order to solve the above-described problems, according to the first invention, a loss compensation device for compensating a loss in periodical signals when the loss occurs in an arbitrary section of the periodical signals which are divided into predetermined sections and received in time series, includes: (1) a periodical signal storage which stores one or more sections of newly received periodical signals for a predetermined period of time; (2) a loss detector which detects a loss of each section of the periodical signals; and (3) an element periodical signal generator which generates a plurality of element periodical signals for interpolation having different waveforms, in accordance with the periodical signals stored in the periodical signal storage, at time of detection of the loss if the loss is detected by the loss detector; (4) wherein the plurality of element periodical signals generated by the element periodical signal generator are synthesized, and a result of the synthesizing is arranged at the section where the loss in the periodical signals has occurred.

Further, according to the second invention, a loss compensation method of compensating a loss in periodical signals when the loss occurs in an arbitrary section of the periodical signals which are divided into predetermined sections and received in time series, includes the steps of: (1) storing one or more sections of newly received periodical signals for a predetermined period of time, by a periodical signal storage; (2) detecting a loss of each section of the periodical signals, by a loss detector; (3) generating a plurality of element periodical signals for interpolation having different waveforms, by an element periodical signal generator, in accordance with the periodical signals stored in the periodical signal storage, at time of detection of the loss if the loss is detected by the loss detector; and (4) synthesizing the plurality of element periodical signals generated by the element periodical signal generator to arrange a result of the synthesizing at the section where the loss in the periodical signals has occurred.

Furthermore, according to the third invention, a loss compensation program for compensating a loss in periodical signals when the loss occurs in an arbitrary section of the periodical signals which are divided into predetermined sections and received in time series, allows a computer to achieve: (1) a periodical signal storage function of storing one or more sections of newly received periodical signals for a predetermined period of time; (2) a loss detection function of detecting a loss of each section of the periodical signals; and (3) an element periodical signal generation function of generating a plurality of element periodical signals for interpolation having different waveforms, in accordance with the periodical signals stored in the periodical signal storage, at time of detection of the loss if the loss is detected by the loss detector; (4) wherein the plurality of element periodical signals generated by the element periodical signal generator are synthesized, and a result of the synthesizing is arranged at the section where the loss in the periodical signals has occurred.

EFFECT OF THE INVENTION

The present invention can improve flexibility and communication quality in a broad sense, and it is possible to effectively use storage resources.

EXPLANATION OF THE REFERENCE SYMBOLS 10 decoder; 11, 13, 14, 15 compensator; 12 loss detector; 20 communication system; 21 network; 22, 23 communication terminal; 30a, 30b, 71a, 71b, 90 controller; 31a, 31b interpolation execution section; 32a, 32b fundamental period calculator; 33a, 33b decoding result storage; 34 synthesis section; 35a, 35b, 75a, 75b, 325a, 325b interpolation function section; 81 weight updating section; 96 control switching section; 97 state holder; 331 random weight generator; 321, 322 selector; PK11 to PK13 packet; CD audio data; DC decoding result; ER audio loss information; Pa, Pb fundamental period.

Best Mode For Carrying Out The Invention (A) Embodiment

An embodiment when a receiving device and a receiving method relating to the present invention are applied to voice communication using VoIP, as an example, will be described below.

(A-1) Structure in First Embodiment

Figure 10:
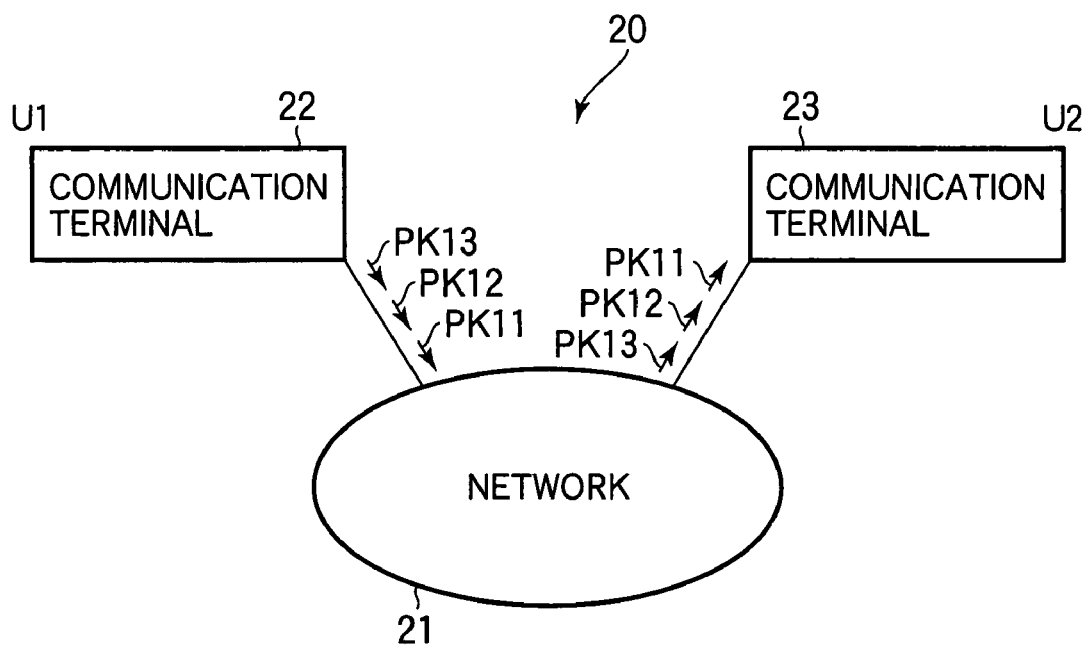
FIG. 10 is a schematic diagram showing an example of the whole structure of a communication system in each of the first to fifth embodiments.

An example of the whole structure of a communication system 20 relating to the present invention is shown in FIG. 10.

Referring to FIG. 10, the communication system 20 includes a network 21 and communication terminals 22 and 23.

Of these constituent elements, the network 21 may be the internet, or an IP network provided by a communication common carrier and having a communication quality assured to some extent.

Further, the communication terminal 22 is a communication device, such as an IP phone system (VoIP phone system) which can perform voice telephone conversation in real time. The IP phone system enables the voice telephone conversation by exchanging audio data over a network using IP protocol through the use of VoIP technology. The communication terminal 23 is a communication terminal having the same configuration as that of the communication terminal 22.

The communication terminal 22 is used by an user U1, and the communication terminal 23 is used by an user U2. In general, IP phone systems interactively exchange audio data in order that users can have a conversation with each other, whereas the following description focuses on the direction in which IP packets (packets) PK11 to PK13 and so on, which contain an audio frame (frame) sent from the communication terminal 22, and these packets are received at the communication terminal 23 over the network 21.

A length of one frame is not limited, it may be, for example, 10 ms, etc. Furthermore, the encoding method may be a method using a PCM audio encoding method.

The frames contained in the packets PK11 to PK13 includes audio data indicating the contents (speech information), i.e., a voice uttered by the user U1. With respect to this data transmission direction, the communication terminal 23 performs only receiving processing and the user U2 only hear the voice uttered by the user U1. Although a packet may contain a plurality of frames, a packet containing a single frame will be used below for simplicity of description.

Of these packets, the packets PK11 to PK13 are sent in a fixed order (corresponding to the order of reproduction output at the receiver), that is, the packets PK11 to PK13 are sent in the order of PK11, PK12, PK13, . . . .

If the packets are sent in the order of PK11, PK12, PK13, . . . , although in most cases, all the packets are received at the communication terminal 23 in this order with no lack, a packet loss may be caused because of congestion in a router (not shown in the figures) on the network 21 or the like. The packet lost by the packet loss may be the packet PK13, for example.

If the packet PK11 corresponds to the frame F2, the packet PK12 corresponds to the frame F3 and the packet PK13 corresponds to the frame F4. Accordingly, if the packet PK13, for example, is lost in the network 21, the frame F4 is lost so that an audio loss is caused in a section corresponding to the frame F4.

Figure 1:
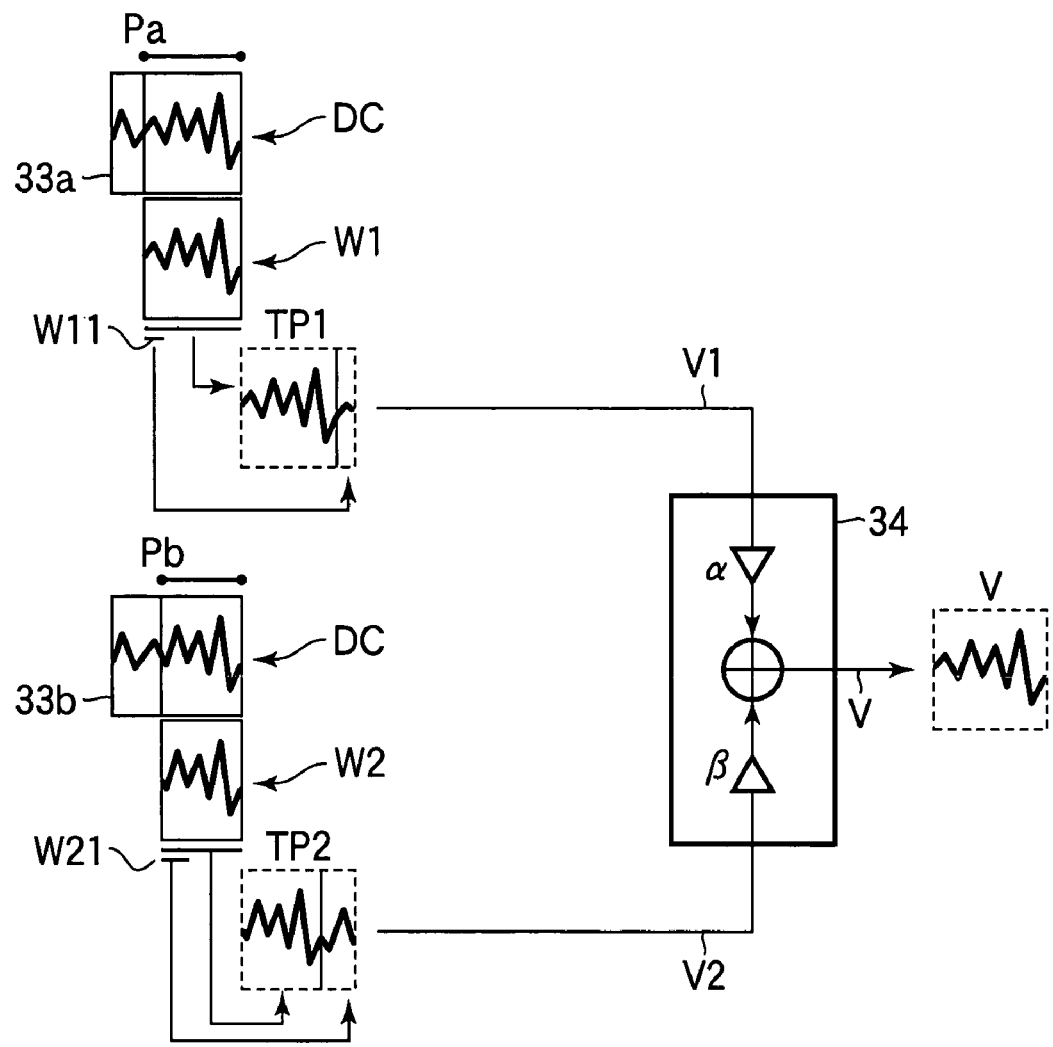
FIG. 1 is a diagram for explaining operation in the first embodiment.

Since the present embodiment is characterized in a function of the receiver side, the communication terminal 23 is focused in the following description. An example of the structure of the main part of the communication terminal 23 is shown in FIG. 1. The communication terminal 22 may have the same structure as the communication terminal 23 in order to perform receiving processing.

(A-1-1) Example of Structure of Communication Terminal

Figure 3:
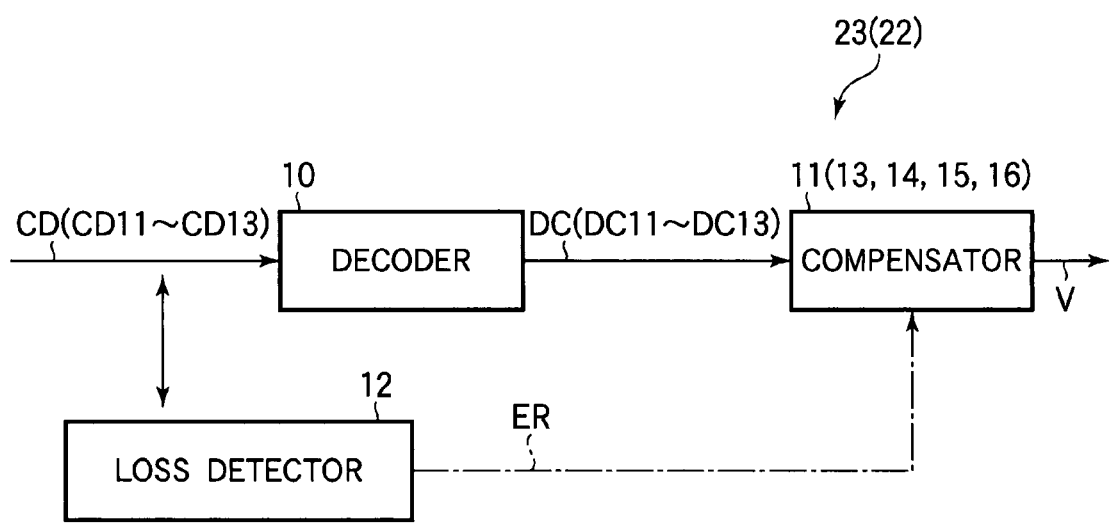
FIG. 3 is a schematic diagram showing an example of internal structure of a communication terminal in each of the first to fifth embodiments.

Referring to FIG. 3, the communication terminal 23 includes a decoder 10, a compensator 11, and a loss detector 12.

Of these constituent elements, the decoder 10 decodes audio data (e.g., CD11) extracted from a packet (e.g., PK11, etc.) received at the communication terminal 23 for each packet to output a decoding result (e.g., DC11). A unit of decoding processing (a unit of processing) by the decoder 10 is a frame. Here, a decoding result obtained from the packet PK11 is referred to as DC11, a decoding result obtained from the packet PK12 is referred to as DC12, and a decoding result obtained from the packet PK13 is referred to as DC13. As a matter of course, when voice telephone conversation continues with no audio loss, the decoding result DC13 and the succeeding decoding results can be obtained.

If a distinction should be made among individual audio data, reference symbols such as CD11 to CD13 are used, and a reference symbol CD is used for generally referring audio data. Similarly, if a distinction should be made among individual decoding results, reference symbols such as DC11 to DC13 are used, and a reference symbol DC is used for generally referring the decoding results. The decoding result DC may indicate either a part of decoding results (e.g., DC1) obtained from a packet or a part of decoding results obtained from successive plural packets (e.g., DC1 and DC2).

Generally, voice uttered by a person contains a noise portion, in which randomly change in amplitude occurs, and a periodical sound portion, in which almost periodical repeat is performed. The repetition time of the periodical sound portion is referred to as a fundamental period. For this reason, the fundamental period can be also determined in accordance with the decoding results DC11 to DC13.

Further, one item of audio data (e.g., CD11) is sampled by the communication terminal 22 at the sender side and obtained as a result of encoding. Therefore, the number of samples included therein is arbitrarily set, and it may be about 160 samples, for example.

The compensator 11 is a characteristic constituent element in the first embodiment and performs interpolation when an audio loss occurs. A detailed description of the structure and functions of the compensator 11 will be described later.

The loss detector 12 determines whether an audio loss is present or not and outputs a determination result as audio loss information ER. It is possible to determine the presence of an audio loss in various ways. For example, it can be judged that an audio loss occurs when a packet to be received has not been received.

In this case, for example, it can be also judged that an audio loss occurs, when there is a lack in serial sequence numbers added at the sender side to the RTP headers which are contained in a transmitted packet, or when transposition in the order is caused and when the current sequence number is older than the sequence number of a packet which has already been received. Moreover, it can be determined that an audio loss occurs when a packet which delays more than a predetermined value, in accordance with time stamp values which are contained in the RTP headers and are departure time information added at the sender side. Furthermore, it can be also considered to be an audio loss when a transmission error is detected. The loss detector 12 may be provided inside the decoder 10 so as to be able to realize such functions.

Figure 4:
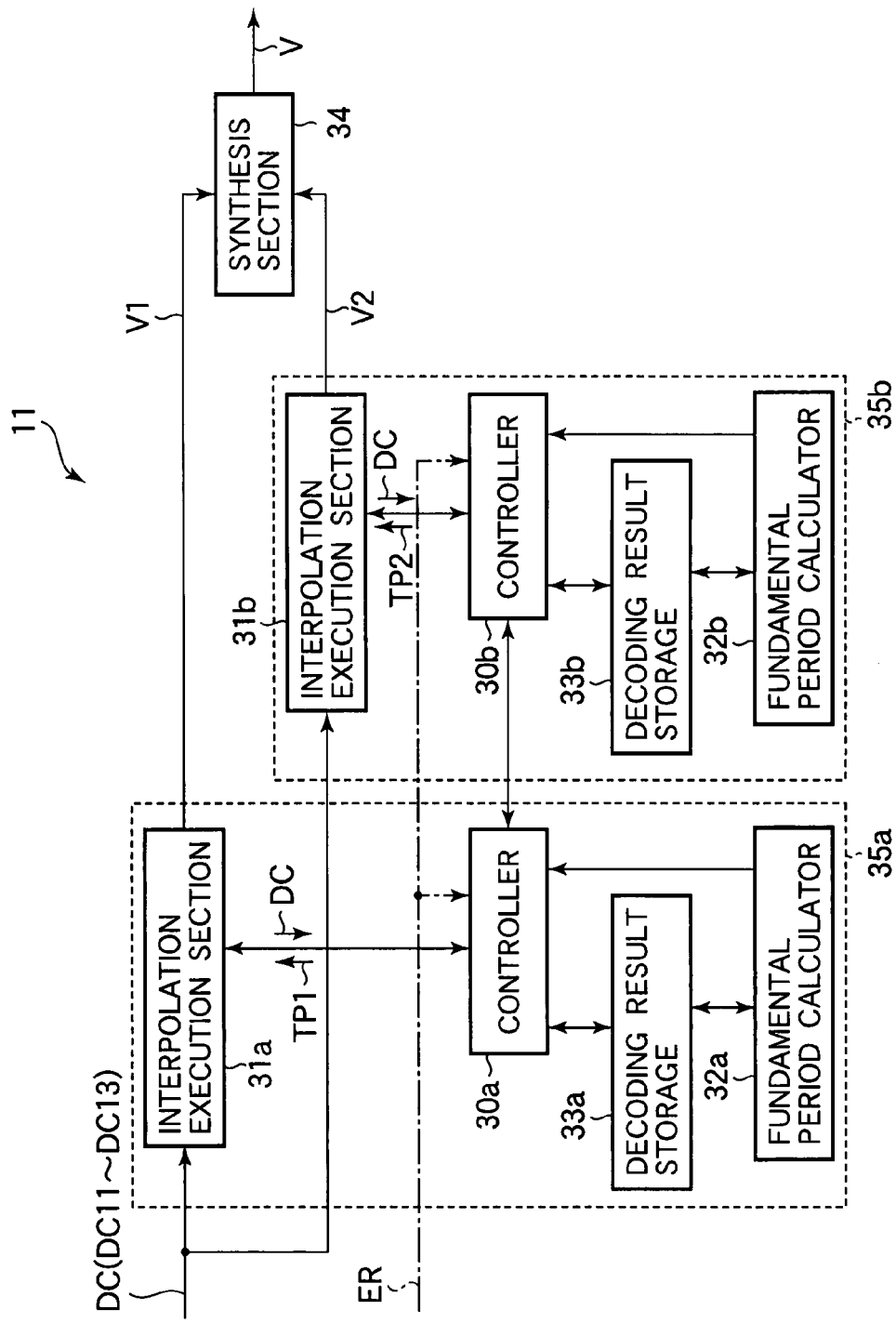
FIG. 4 is a schematic diagram showing an example of internal structure of a compensator used in the first embodiment.

The internal structure of the compensator 11 is shown in, for example, FIG. 4.

(A-1-2) Example of Internal Structure of Compensator

Referring to FIG. 4, the compensator 11 includes two interpolation function sections 35a and 35b, and a synthesis section 34.

The interpolation function sections 35a and 35b have the same internal structure. More specifically, the interpolation function section 35a includes a controller 30a, an interpolation execution section 31a, a fundamental period calculator 32a, and a decoding result storage 33a. On the other hand, the interpolation function section 35b includes a controller 30b, an interpolation execution section 31b, a fundamental period calculator 32b, and a decoding result storage 33b.

The controller 30a corresponds to the controller 30b, the interpolation execution section 31a corresponds to the interpolation execution section 31b, the fundamental period calculator 32a corresponds to the fundamental period calculator 32b, and the decoding result storage 33a corresponds to the decoding result storage 33b. Since the functions of the interpolation function section 35a and the interpolation function section 35b are the same, the following description mainly focuses on the interpolation function section 35a.

In the interpolation function section 35a, the controller 30a can perform a function of a CPU (central processing unit) which is a function of hardware and can perform a function of a control program such as an OS (operating system) which is a function of software. For this reason, each of the constituent elements 31a to 33a in the interpolation function section 35a is controlled by the controller 30a.

In the present embodiment, a series of signals of the decoding result DC having the completely same content is supplied to the interpolation function sections 35a and 35b. It is the interpolation execution section 31a that receives the decoding result DC in the interpolation function section 35a.

The interpolation execution section 31a differently acts in normal duration when no audio loss occurs (corresponding to the normal state described later) and in loss duration when an audio loss occurs (corresponding to the loss compensation state described later). In normal duration, only the decoding result DC received from the decoder 10 is supplied to the controller 30a and the synthesis section 34. In loss duration, on the other hand, interpolation audio data TP1 supplied from the controller 30a is inserted into a section with no valid decoding result DC in a series of signals of the decoding result DC because of an audio loss, a series of signals which contains the insert result is supplied to synthesis section 34. A series of signals which mainly contains the decoding result DC and which is supplied to the synthesis section 34 by the interpolation execution section 31a is an intermediate signal V1. Although in normal duration, a series of signals in their contents the intermediate signal V1 and the decoding result DC are completely the same, in loss duration, the intermediate signal V1 is a series of signals in which the interpolation audio data TP1 is inserted into a section with no valid decoding result DC because of an audio loss.

The loss duration includes a case where an audio loss singly occurs in a frame and another case where audio losses successively occur in a plurality of frames. The first embodiment is more effective than conventional arts mainly in the latter case in which an audio loss successively occurs.

The decoding result storage 33a stores the decoding result DC supplied from the interpolation execution section 31a to the controller 30a and includes volatile or non-volatile memory means. In consideration of voice telephone conversation to which real-timeliness is of importance, it is quite possible that an expensive storage means which enables high-speed read and write access is used as the decoding result storage 33a, although depending on implementation.

Any upper limit of storage capacity of the decoding result storage 33a is available. The present embodiment describes a case where the storage capacity is enough to store the decoding result DC of one fundamental period. Since the length of one fundamental period is variable depending on the voice content, to strictly store data or signals corresponding to the length of one fundamental period, it is likely to be necessary to calculate fundamental period of the decoding result before the storing to store only data or signals corresponding to the length of one fundamental period obtained and to provide a working storage in which more than the decoding result of one fundamental period is temporarily stored for the calculation of fundamental period, except for a special case in which the length of one fundamental period is determined in advance. However, the problem is inevitable to implement the art of Non-Patent Document 1 in actual equipment. Accordingly, when the decoding result of three fundamental periods is strictly stored in accordance with the Non-Patent Document 1, it is likely to necessary to calculate fundamental period before storing and to provide storage capacity for more than the length of three fundamental periods in a working storage, actually. In general, the decoding result of one fundamental period may be obtained from one frame of the decoding result or a plurality of frames of the decoding result.

It is also available to provide the decoding result storage 33a with sufficiently larger storage capacity than an upper limit (a prescribed value) of variation range of the length of one fundamental period, for example, in order to store the latest decoding result which fills the storage capacity. If the decoding result DC of one frame is long enough in comparison with the upper limit of the variation range, it is possible to provide the decoding result storage 33a with storage capacity for storing the decoding result DC of one frame. Moreover, in this case, it is not necessarily to calculate fundamental period before storing in the decoding result storage 33a and thereby it is possible to effectively use a working storage and reduce amount of computation.

In a case of the storage capacity for only data of one fundamental period (one frame), whenever the decoding result of one fundamental period DC is obtained from a new frame (whenever a new frame arrives), it is necessary to overwrite the previously stored one fundamental period (one frame) and the like, and only the latest decoding result DC of one fundamental period (one frame) is always kept to be stored in the decoding result storage 33a. In a section in which an audio loss occurs, because valid decoding result DC is not supplied, overwriting is not performed and the decoding result DC of one fundamental period stored immediately before is maintained in the decoding result storage 33a. It is similar in a case that the audio loss continues for a plurality of frames.

The loss detector 12 supplies audio loss information ER indicating that an audio loss has been detected to the controller 30a, the controller 30a can accordingly recognize that an audio loss occurs in the section and thereby it is possible to control to keep storage in the decoding result storage 33a.

The fundamental period calculator 32a calculates the fundamental period using the decoding result DC stored in the decoded voice storage 32a at time of transition from a state of no audio loss to a state when an audio loss exists. There is a possibility to determine a fundamental period in various ways: for example, it can be obtained by determining a known auto-correlation function from the decoding result DC stored in the decoding result storage 33a and then calculating such amount of delay as the auto-correlation function is maximum.

According to the audio loss information ER, the controller 30a can recognize a transition timing from a state when no audio loss occurs to a state when an audio loss occurs.

Since the audio loss information ER is supplied to the controller 30b in the interpolation function section 35b, the interpolation function section 35a can determine a fundamental period, almost at the same time as the interpolation function section 35b. In the present embodiment, it is necessary that the interpolation audio data TP1 supplied to the interpolation execution section 31a by the controller 30a differs from the interpolation audio data TP2 supplied to the interpolation execution section 31b by the controller 30b. However, the interpolation audio data TP1 obtained at the interpolation function section 35a and the interpolation audio data TP2 obtained at the interpolation function section 35b are the same if methods of determining a fundamental period are the same, because the decoding result storages 33a and 33b store the same decoding result DC. Therefore, different fundamental periods are used.

It is possible to obtain different fundamental periods from the decoding results DC containing the same contents in various ways. In the present embodiment, for example, a controller (e.g., 30a) which calculates a fundamental period earlier sends the calculated fundamental period value to the other controller (e.g., 30b), and besides calculates another fundamental period excluding the value.

If no control is exercised, it is likely that calculations of the fundamental periods in the interpolation function sections 35a and 35b complete at the almost same time. So, it is advisable that one of them calculates in advance and after the calculated result is received, the other performs the calculation. For example, the interpolation function section 35a performs previous to the interpolation function section 35b, however, whichever can be preceding to the other.

Here, a reference symbol Pa denotes a fundamental period calculated by the fundamental period calculator 32a in the interpolation function section 35a, and a reference symbol Pb denotes a fundamental period calculated by the fundamental period calculator 32b in the interpolation function section 35b within a search range in which the fundamental period Pa is not included. If the fundamental period Pa takes values from 5 ms to 15 ms, the fundamental period Pb takes values from 2.5 ms to a value of Pa (exclusive of Pa itself), for example.

In general, since an audio signal is considered to be a sum of a lot of frequency components, a fundamental period having the largest components can be the above-mentioned Pa and a fundamental period having the next largest components can be the above-mentioned Pb. Accordingly, although the fundamental period Pb is different from the original fundamental period of the decoding result DC stored in the decoding result storage 33b (i.e., the fundamental period Pa), the fundamental period Pb reflects the characteristic of the decoding result DC.

If necessary, the controller 30a may provide the controller 30b with the calculated fundamental period Pa to as described above. Whereas, when one fundamental period is calculated before storing the decoding result DC in the decoding result storage 33b, it is made possible by storing the value that the controller 30b recognizes Pa and searches the fundamental period Pb within a search range which is different from that of Pa.

The synthesis section 34 applies weight factors to an intermediate signal V1 supplied from the interpolation execution section 31a in the interpolation function section 35a and an intermediate signal V2 supplied from the interpolation execution section 31b in the interpolation function section 35b, then synthesizes, and outputs the synthesis result as a final output audio signal V. It is advisable $$\alpha+\beta=1.0$$

where a weight factor applied to the intermediate signal V1 is referred to as $\alpha$ and a weight factor applied to the intermediate signal V2 is referred to as $\beta$. Here, $\alpha=0.8$ and $\beta=0.2$, for example.

Operations in the present embodiment having the structure described above will be described below.

In the present embodiment, the communication terminal 23 performs four operations for receiving a signal. The first operation is a normal operation which is performed in the normal state in which frames continue to be normally received with no audio loss. The second operation is a loss transition operation which is performed when an audio loss of one frame is detected and transition is caused from the normal state to the loss compensation state. The third operation is a normal transition operation which is performed when transition is caused from the loss compensation state to the normal state. The loss compensation state contains the following two cases: a case where one frame of an audio loss occurs and another case where audio losses in a plurality of frames occur.

Here, the normal state is a state in which the preceding frame and the current frame are validly received, thereby obtaining a valid decoding result DC. The loss transition operation is performed when the preceding frame is received and a valid decoding result DC is obtained, however the current frame is failed to receive and no valid decoding result DC is obtained.

The normal transition operation is performed when the preceding frame is failed to receive and no valid decoding result DC is obtained, on the other hand the current frame is received and a valid decoding result DC is obtained. If audio losses in a plurality of frames occur, neither the preceding nor the current frames cannot be received and no valid decoding results DC can be obtained.

(A-2) Operation of First Embodiment

The communication terminal 23 used by the user U2 receives packets in a temporary order of PK11, PK12, PK13, . . . (containing frames) sent from the communication terminal 22 used by the user U1, VoIP communication is thus performed, the communication terminal 23 performing the normal operation outputs voice uttered by the user U1 and thereby the user U2 can hear the voice.

When the normal operation is performed, the decoder 10 in the communication terminal 23 outputs a series of signals of the decoding result DC containing the decoding results DC11, DC12, DC13, . . . , and then the series of signals is supplied to the synthesis section 34 through the interpolation execution sections 31a and 31b. In the normal state in which the normal operation is performed, because no audio loss occurs, the interpolation execution sections 31a and 31b supply to the synthesis section 34 the a series of signals received from the decoder 10 as intermediate signals V1 and V2, and the synthesis section 34 outputs an output audio signal V which is a synthesis result. The user U2 hears voice that the communication terminal 23 corresponds to the output audio signal V.

At this time, the interpolation execution sections 31a and 31b supply the decoding result DC received from the decoder 10 to the controllers 30a and 30b, and every time one frame of the decoding result DC is newly supplied, the controllers 30a and 30b calculate a new one fundamental period (one frame) of the decoding result DC and the calculation result are stored in the decoding result storages 33a and 33b. Since the decoding result storages 33a and 33b have storage capacity only for one fundamental period (one frame) of the decoding result, a stored decoding result (a part of DC11, for example) corresponding to s certain one fundamental period (one frame) is lost when another decoding result (e.g., a part of DC12) corresponding to the next one fundamental period (one frame) is stored. For this reason, only the latest one fundamental period (one frame) of the decoding result DC remains in the decoding result storages 33a and 33b.

For example, immediately after the decoding result DC of one fundamental period obtained from the decoding result DC12 is stored in the decoding result storages 33a and 33b, the loss detector 12 supplies audio loss information ER indicating that an audio loss has been detected to the controllers 30a and 30b, the loss transition operation is performed and thereby the compensator 11 shifts from the normal state to the loss compensation state. At this time, the controllers 30a and 30b judge that it is necessary to generate the interpolation audio data TP1 and TP2 in order to compensate the decoding result DC13 which is lost because of the audio loss, and the controllers 30a and 30b provide each of the fundamental period calculators 32a and 32b instructions to calculate fundamental period through the use of one fundamental period of the decoding result (DC12, for example) stored at the time in the decoding result storages 33a and 33b.

In a case where one fundamental period is calculated before storing in the decoding result storage 33a as described above, the calculation result can be stored in order to reuse it.

Here, if the fundamental period calculator 32a calculates a fundamental period Pa as shown in FIG. 1, the fundamental period calculator 32b calculates a fundamental period Pb which is different from the fundamental period Pa.

In the example shown in FIG. 1, the decoding result storages 33a and 33b store a decoding result DC which is slightly larger than the original one fundamental period Pa. Here, the decoding result DC can be one frame of the decoding results.

Figure 2A:
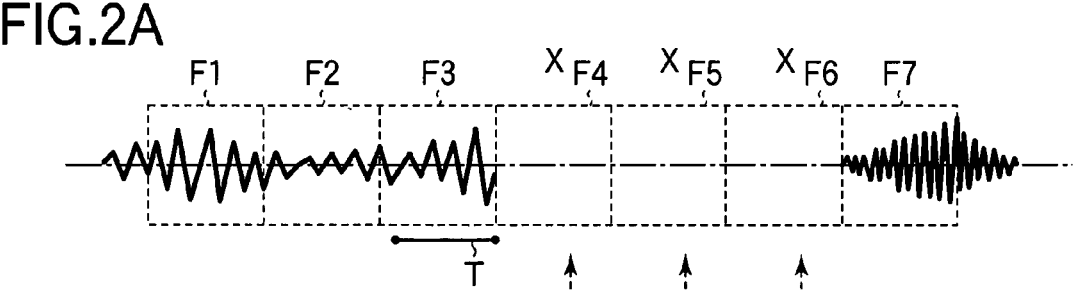
FIGS. 2A-2E are diagrams schematically showing a conventional operation for producing an interpolated audio signal.
Figure 2B:
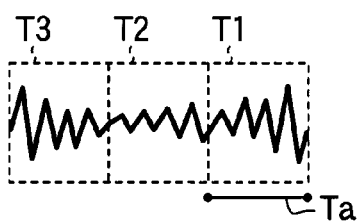
Figure 2C:
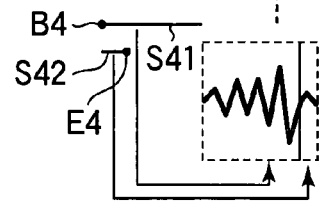
Figure 2D:
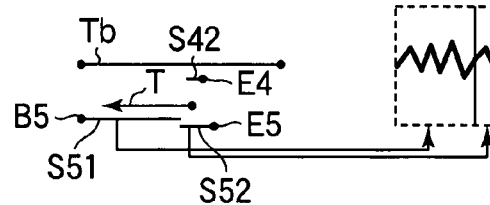
Figure 2E:
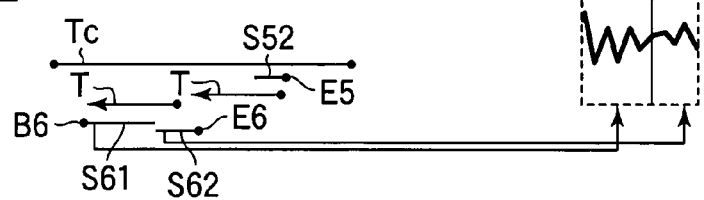

In this case, one fundamental period Pa of the decoding result W1 less than one time frame causes insufficiency, the controller 30a in the interpolation function section 35a supplements the insufficiency through the use of a part W11 of one fundamental period Pa of the decoding result W1. The processing at the time can be the same as that when S42 and S41 are joined in FIG. 2C described above. It is similar to the example of FIG. 2C to perform overlapadd and the like in order to make the waveform uninterrupted at the joint. At this time, the beginning of the waveform of the interpolation audio data TP1 is set to be in phase with the last phase immediately before the loss in order to make the waveform uninterrupted at the joint.

The interpolation audio data TP1 thus generated by the controller 30a is supplied to the interpolation execution section 31a and supplied to the synthesis section 34 as a part of a series of signals of the intermediate signal V1.

At this time, at the almost same time, in the interpolation function section 35b, the fundamental period calculator 32b calculates a fundamental period Pb which is different from the fundamental period Pa. The controller 30b accordingly obtains the fundamental period Pb of the decoding result W2 from one frame of the decoding result stored in the decoding result storage 33b and supplements a temporal insufficiency with a partial decoding result W21 which is a part of the decoding result W2.

The waveform of the interpolation audio data TP2 thus generated by the controller 30b is different from that of the interpolation audio data TP1 as shown in FIG. 1. The interpolation audio data TP2 is supplied to the interpolation execution section 31b and supplied to the synthesis section 34 as a part of the intermediate signal V2.

The synthesis section 34 gives the weight factors α and β to the interpolation audio data TP1 and TP2 to synthesize and outputs the synthesis result as output audio signals V.

The interpolation audio data TP1 and TP2 which are generated in accordance with the same decoding result DC reflect the characteristic of the decoding result DC indicating the original voice. Accordingly, the output audio signal V generated as the result of synthesizing the interpolation audio data TP1 and TP2 also reflect the characteristic of the decoding result DC indicating the original voice and high quality that the user U2 scarcely senses unnatural can be realized. The output audio signal V thus generated generally differs in waveform from an output audio signal V in a section corresponding to the preceding frame where valid decoding result DC is obtained.

If an audio loss ends for one frame, a valid decoding result DC14 (not shown in the figures) is accordingly supplied from the decoder 10 immediately, the compensator 11 performs the normal transition operation to store one frame of (or one fundamental period of) the decoding result corresponding to the decoding result DC14 in the decoding result storages 33a and 33b. At this time, overlapadd can be performed in order to make the waveform uninterrupted at the joint of the valid decoding result and the generated interpolated voice.

On the other hand, if an audio loss does not end for one frame and audio losses continues for several frames, it is also available that the controllers 30a and 30b output the interpolation audio data TP1 and TP2 having the waveforms shown in FIG. 1 to the interpolation execution sections 31a and 31b. In order to generate the interpolation audio data TP1 and TP2 corresponding to the second frame and the later frames of the continuing an audio loss, however, it is also preferable to start the generation from the sample next to the last sample used for generating interpolation audio data at the preceding frame. Thereby, it is possible to reliably provide an uninterrupted waveform, to effectively use limited stored decoding result DC, and to reduce a repetition of the same waveform in the output audio signal V in a unit of time. It is also preferable to change time durations used for the interpolation audio data TP1 and TP2 among limited period of the decoding result DC stored in the decoding result storages 33a and 33b.

In any case, if interpolation audio data TP1 and TP2 obtained by using a recursive procedure is unchanged and output from the limited decoding result DC stored in the decoding result storages 33a and 33b, one or a plurality of waveforms, such as the output audio signal V having the waveform shown in FIG. 1, are repeatedly output and it may cause a beep noise and the like. In order to prevent such beep noise, for example, it is preferable to change the weight factors α and β. Thereby, even if the audio loss continues far more than three fundamental period, a valid audio loss compensation can be continue without outputting no sound and the user U2 can recognize high quality.

Further, the storage capacity of the decoding result storages 33a and 33b is enough if it corresponds to one frame or one fundamental period, and the storage capacity is far less than that in the conventional art.

If a valid decoding result DC is newly supplied to the compensator 11 when the audio loss continues, the normal transition operation is performed, in the similar manner to the case where the audio loss terminates for one frame.

(A-3) Effects of First Embodiment

According to the present embodiment, even if the audio loss continues for a long time period, the valid voice loss compensation can continue and therefore flexibility and the communication quality (e.g., quality which the user U2 senses) in a broad sense can be improved and it is possible to effectively use storage resources.

(B) Second Embodiment

The only points that the second embodiment differs from the first embodiment will be described below.

The second embodiment differs from the first embodiment only in the points regarding the internal structure of the compensator.

(B-1) Structure and Operation of Second Embodiment

Figure 5:
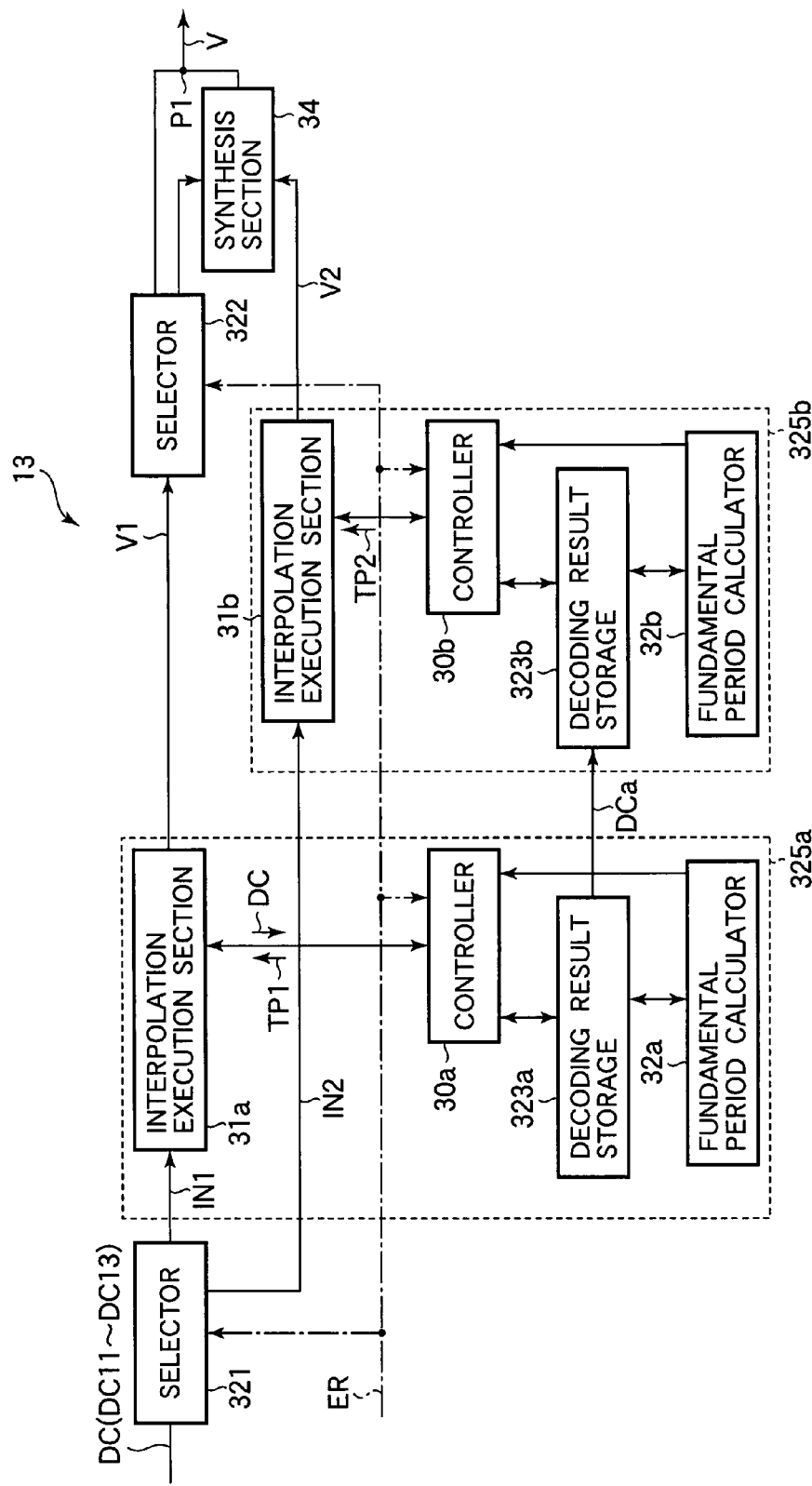
FIG. 5 is a schematic diagram showing an example of internal structure of a compensator used in the second embodiment.

An example of the internal structure of the compensator 13 in the second embodiment is shown in FIG. 5.

Referring to FIG. 5, the compensator 13 includes two interpolation function sections 325a and 325b, the synthesis section 34, and selectors 321 and 322.

Of these constituent elements, the interpolation function sections 325a and 325b have the same internal structure. That is, the interpolation function section 325a includes the controller 30a, the interpolation execution section 31a, the fundamental period calculator 32a, and the decoding result storage 323a. On the other hand, the interpolation function section 325b includes the controller 30b, the interpolation execution section 31b, the fundamental period calculator 32b, and the decoding result storage 323b.

Since the functions of the constituent elements with the same reference symbols in FIG. 4 are the same as those in the first embodiment, their detailed description is omitted.

The second embodiment is characterized in parts relating to the selectors 321 and 322.

The selector 321 in the normal state only supplies the decoding result DC to the interpolation execution section 31a as the decoding result IN1. Receiving it, the interpolation function section 325a stores the decoding result IN1 corresponding to new one frame (or one fundamental period) in the decoding result storage 323a. However, such storing is not performed in the interpolation function section 325b. At the time the elements in the interpolation function section 325b, such as the interpolation execution section 31b, the fundamental period calculator 32b, and the decoding result storage 323b may be in a sleep mode, in which they do not perform valid operations. In the sleep mode, it is possible to effectively use storage resources and to reduce amount of computation because the storage resources and computing powers are scarcely utilized.

Further, the selector 322 receives only the intermediate signal V1 supplied from the interpolation execution section 31a and then outputs the intermediate signal V1 to the synthesis section 34 or a connecting point P1.

The selector 322 in the normal state outputs the intermediate signal V1 to the connecting point P1. In the normal state, the intermediate signal V1 is unchanged and output as the final output audio signal V. The synthesis section 34 is not required to perform processing regarding the weight factors α and β, contrary to the first embodiment, and thus it is possible to effectively use storage resources and to reduce amount of computation.

After a transition to the loss compensation state is caused due to an audio loss, the selector 322 outputs the intermediate signal V1 to the synthesis section 34. Then, in accordance with the audio loss information ER, the controllers 30a and 30b are informed that an audio loss has been detected, the controllers 30a and 30b copy the decoding result DC from the decoding result storage 323a in the normal state to the decoding result storage 323b (DCa). After the copying, the decoding result storages 323a and 323b store the decoding results DC whose contents are the same, and accordingly the interpolation audio data TP1 and TP2 can be generated in the two interpolation function sections 323a and 323b, in the similar manner to the first embodiment. It is similar to the example of the first embodiment that each of the generated interpolation audio data TP1 and TP2 is supplied to the interpolation execution sections 31a and 31b to be synthesized at the synthesis section 34.

It is advisable to use the weight factors α and β for the synthesis likewise in the second embodiment. Thereby, even if the audio loss continues for a long time period, it is possible to continue valid voice loss compensation with a noise suppressed.

Also, when a transition from the normal state to the loss compensation state is caused, the selector 321 can supply the decoding result IN2 whose content is the same as that of the decoding result IN1 to the interpolation execution section 31b. However, at that time, it is unlikely required that the decoding result IN2 is supplied to the interpolation execution section 31b, except for a case that a control signal such as a signal informing frame timing is required to supply, because valid decoding result DC is not supplied from the decoder 10 due to the audio loss. If the decoding result IN2 is not supplied to the interpolation execution section 31b in the loss compensation state, the selector 321 can be omitted and the decoding result DC output from the decoder 10 is supplied only to the interpolation execution section 31a.

When the device returns to the normal state, the selector 322 becomes to output the intermediate signal V1 to the connecting point P1 again. Also, each parts in the interpolation function section 325b returns to the sleep mode in which they do not perform valid operations.

(B-2) Effects of Second Embodiment

According to the present embodiment, the same effects as those in the first embodiment can be obtained.

Moreover, according to the present embodiment, one of the interpolation function section (325b) is in the sleep mode and the synthesis section (34) does not function in the normal state, and thus it is possible to more effectively use storage resources and to further reduce amount of computation.

(C) Third Embodiment

Only the points that the third embodiment differs from the first and second embodiments will be described below.

The third embodiment differs from the first and second embodiments only in the points regarding the internal structure of the compensator.

The third embodiment is closer to the first embodiment between the first and second embodiments.

(C-1) Structure and Operation of Third Embodiment

Figure 6:
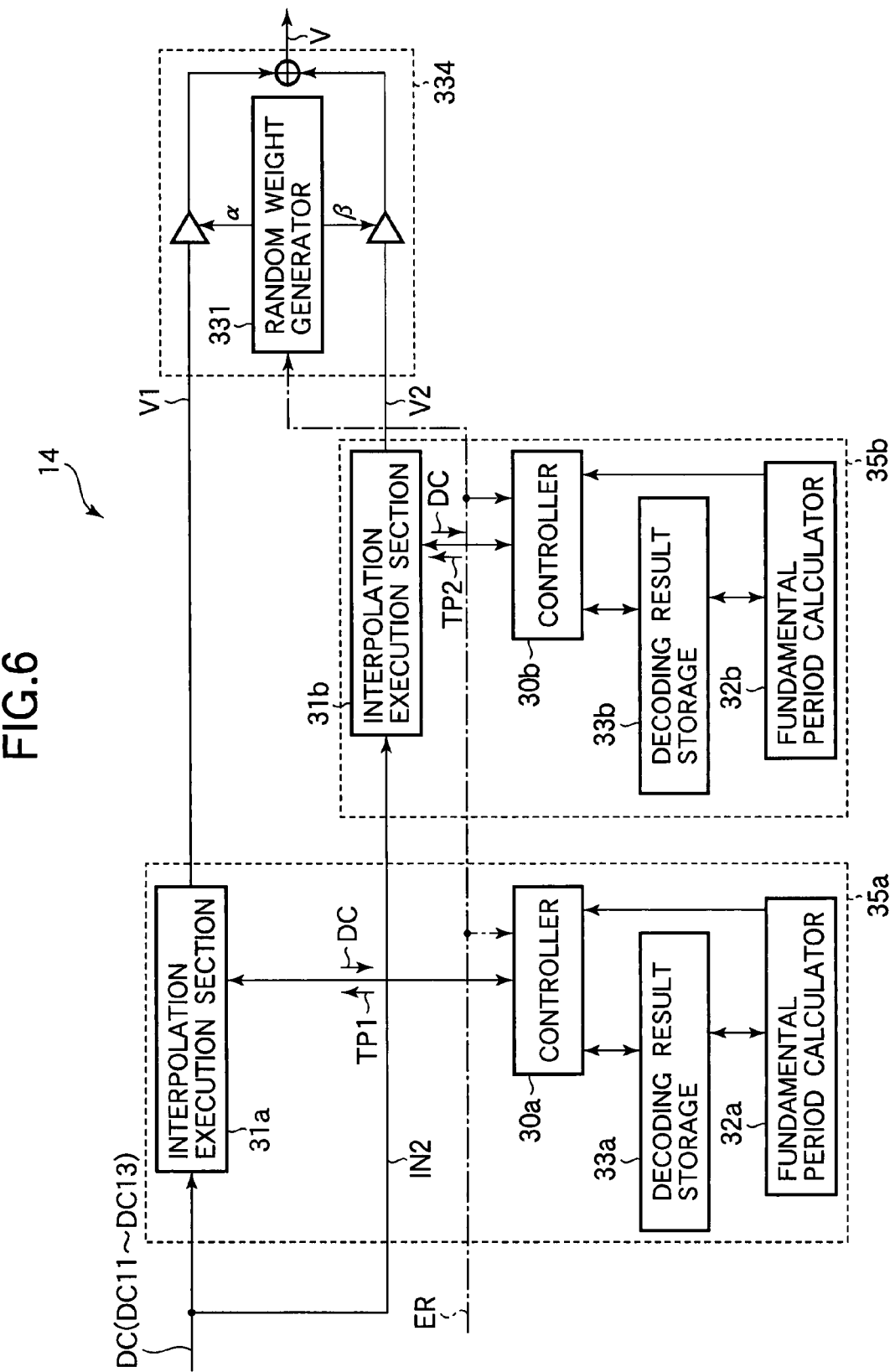
FIG. 6 is a schematic diagram showing an example of internal structure of a compensator used in the third embodiment.

An example of the internal structure of a compensator 14 in the third embodiment is shown in FIG. 6.

Referring to FIG. 6, the compensator 14 includes the two interpolation function sections 35a and 35b, and the synthesis section 334.

Of these constituent elements, the interpolation function section 35a and 35b have the same internal structure. That is, the interpolation function section 35a includes the controller 30a, the interpolation execution section 31a, the fundamental period calculator 32a, and the decoding result storage 33a. On the other hand, the interpolation function section 35b includes the controller 30b, the interpolation execution section 31b, the fundamental period calculator 32b, and the decoding result storage 33b.

Since the constituent elements with the same reference symbols as those in FIG. 4 are the same as those in the first embodiment, their detailed description is omitted.

The third embodiment differs from the first embodiment in the internal structure of the synthesis section 334.

In the synthesis section 334, a random weight generator 331 generates weight factors $\alpha$ and $\beta$ each having random values. Also in this case, the relationship, $\alpha+\beta=1$, can be maintained. The random weight generator 331 operates only when the audio loss information ER informs that an audio loss has occurred, thereby generating a random value as almost a white noise.

The value $\alpha$ randomly determined is within a range of $$0.5 < \alpha \leq 1.$$

The range of the value can be further limited within the above mentioned range. For example, the range may be $$0.7 \leq \alpha \leq 0.8.$$

Any way is available to determine the value $\alpha$ as long as the value $\alpha$ is almost randomly determined. For example, in order to update the value $\alpha$ in time series, another way that a variation from value $\alpha$ before updating is randomly generated may be adopted.

Although there is a possibility to generate a random value in various ways, a pseudo-random number or the like is available in the third embodiment where strict randomness is not required.

It is possible to set interval of updating the value $\alpha$ at various values. Updating at every frame is also available.

If the weight factor values $\alpha$ and $\beta$ can be randomly changed at time intervals more than a predetermined value (e.g. at every frame), it is almost unlikely that a same waveform repeatedly emerges in a final output audio signal V and thereby a noise such as a beep noise becomes hard to generate.

(C-2) Effects of Third Embodiment

According to the third embodiment, the same effects as those in the first embodiment can be obtained.

Moreover, in the third embodiment, the weight factor values ($\alpha$, $\beta$) are randomly changed at time intervals more than a predetermined value and accordingly it is possible to reduce a noise such as a beep noise even in audio loss continues for a long time period.

Thereby, it is possible to further improve quality of the voice heard by the user (U2), and to reduce auditory fatigue during a call.

(D) Fourth Embodiment

Only the points that the fourth embodiment differs from the first to third embodiments will be described below.

The fourth embodiment differs from the first to third embodiments only in the points regarding the internal structure of the compensator.

The fourth embodiment is the closest to the second embodiment among the first to third embodiments.

(D-1) Structure and Operation of Fourth Embodiment

Figure 7:
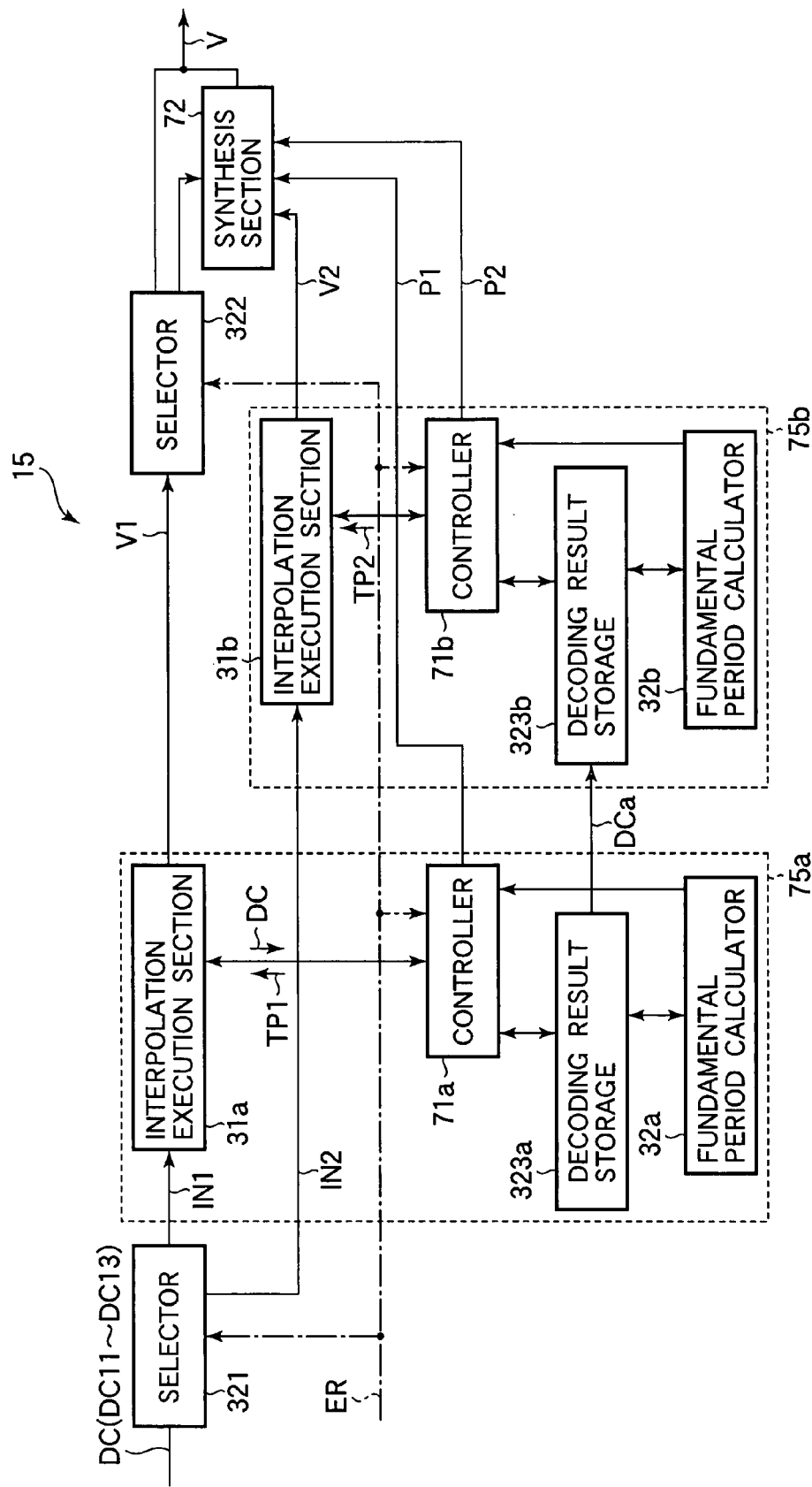
FIG. 7 is a schematic diagram showing an example of internal structure of a compensator used in the fourth embodiment.

An example of the internal structure of a compensator 15 in the present embodiment is shown in FIG. 7

Referring to FIG. 7, the compensator 15 includes two interpolation function sections 75a and 75b, selectors 321 and 322, and a synthesis section 72.

The interpolation function sections 75a and 75b have the same internal structure. That is, the interpolation function section 75a includes a controller 71a, the interpolation execution section 31a, the fundamental period calculator 32a, and a decoding result storage 323a. On the other hand, the interpolation function section 75b includes a controller 71b, the interpolation execution section 31b, the fundamental period calculator 32b, and a decoding result storage 323b.

Regarding each constituent element, since the functions of the constituent elements with the same reference symbols as the constituent elements in FIG. 5 are the same as those in the second embodiment, their detailed description is omitted.

The fourth embodiment differs from the second embodiment in a part of functions of the controllers 71a and 71b and the internal structure of the synthesis section 72.

The controllers 71a and 71b in the fourth embodiment have a function of informing the synthesis section 72 of the fundamental periods P1 and P2 calculated by the fundamental period calculators 32a and 32b in the interpolation function sections 75a and 75b. The fundamental period P1 may correspond to the above-described fundamental period Pa; and the fundamental period P2 may correspond to the above-described fundamental period Pb.

Figure 8:
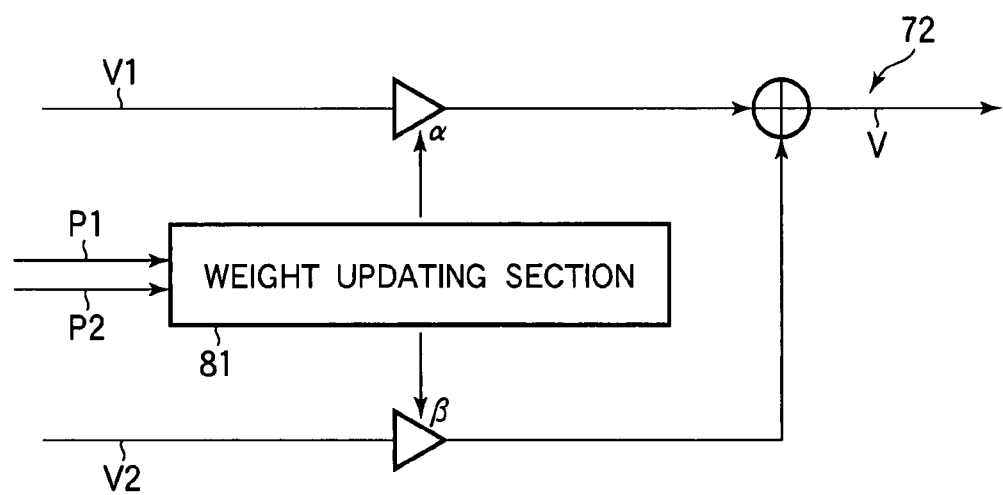
FIG. 8 is a schematic diagram showing an example of internal structure of a synthesis section used in the fourth embodiment.

The synthesis section 72 has the internal structure shown in FIG. 8, for example, and generates weight factors $\alpha$ and $\beta$ corresponding to the fundamental period P1 and P2 supplied to a weight updating section 81.

The weight updating section 81 can update (generate) the weight factors $\alpha$ and $\beta$ in accordance with the fundamental period P1 and P2 in various ways. For example, the weight updating section 81 is set in such a way that P1 and P2 satisfying a condition P1>P2 are produced and to accordingly $$\alpha+\beta=1,\ \alpha=P2/P1.$$

Or, the weight updating section 81 is set so as to determine a value of $\alpha$ in accordance with $$\alpha=1-(P2-P1)/(PM-Pm).$$

Here, PM denotes the maximum value of calculable fundamental period and Pm denotes the minimize value of calculable fundamental period.

Alternatively, it is possible to determine the value $\alpha$ in accordance with a predetermined rule on the basis of features (e.g., power, spectrum, etc.) other than the fundamental period. In this case, it is possible to determine the value $\alpha$ when a transition to the loss compensation state is caused and to use the value until returning to normal state.

Further alternatively, it is possible that the controllers 71a and 71b outputs, instead of the fundamental period P1 and P2, power (e.g., root mean square of a sample value of one fundamental period section) of a waveform of the decoding result DC for every frame section, and the synthesis section 72 updates the value α for every frame section until returning to normal state.

(D-2) Effects of Fourth Embodiment

According to the fourth embodiment, the same effects as those in the second embodiment can be obtained.

Moreover, it is possible to increase the variety according to the fourth embodiment in which a weight factor value (α, β) can reflect various features of the decoding result (DC) stored in a decoding result storage (323a, 323b), such as the fundamental period (P1, P2).

Thus, there is a possibility to further improve the quality of voice heard by the user (U2) and to reduce auditory fatigue during a call in comparison with the second embodiment.

(E) Fifth Embodiment

Only the points that the fifth embodiment differs from the first to fourth embodiments will be described below.

The fifth embodiment differs from the first to fourth embodiments only in the points regarding the internal structure of the compensator.

Since the fourth embodiment includes the selectors 321 and 322 and the like, the fourth embodiment is the closest to the fifth embodiment among the first to fourth embodiments.

(E-1) Structure and Operation of Fifth Embodiment

Figure 9:
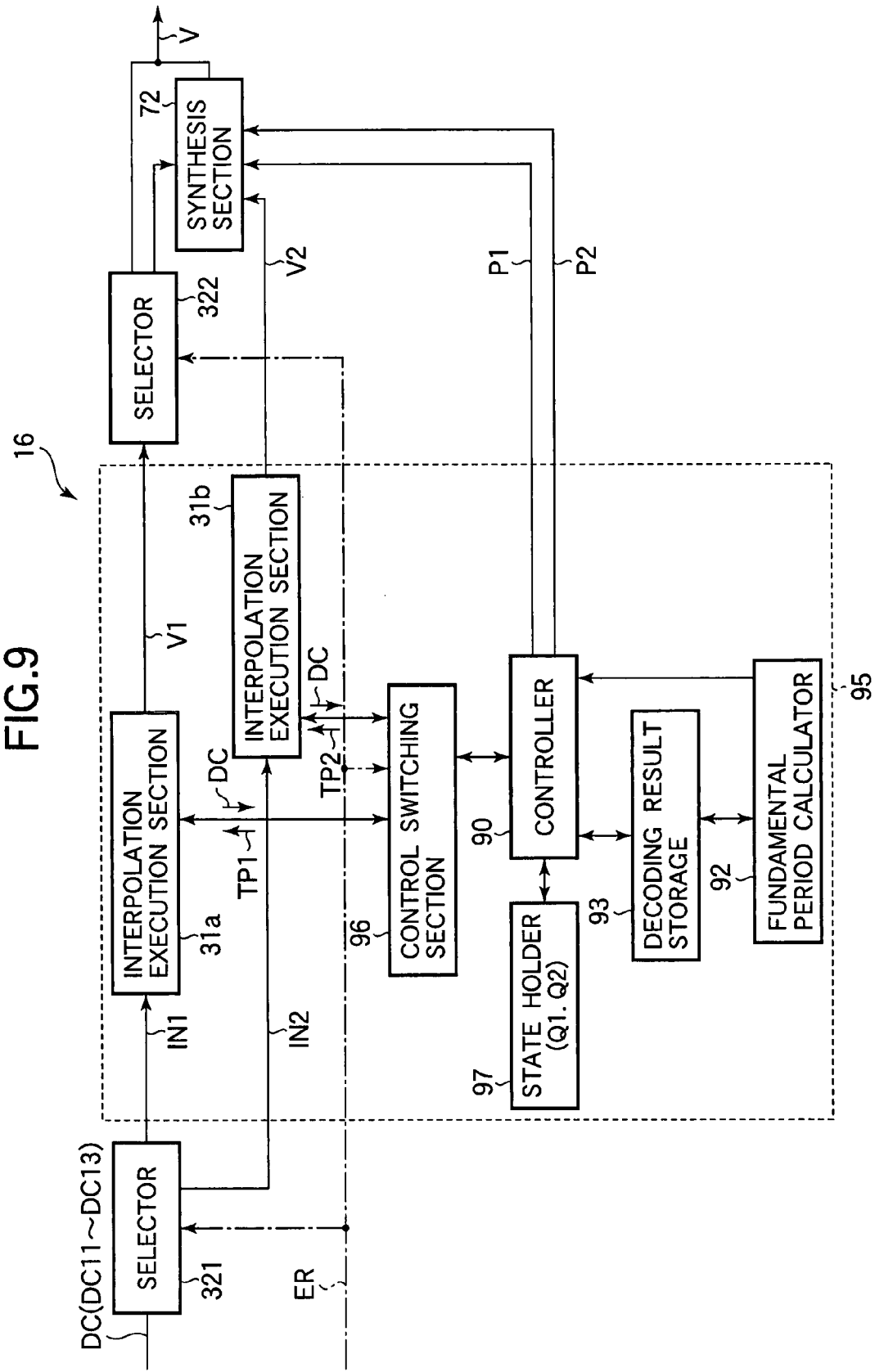
FIG. 9 is a schematic diagram showing an example of internal structure of a compensator used in the fifth embodiment.

An example of the internal structure of the compensator 16 in the fifth embodiment is shown in FIG. 9.

Referring to FIG. 9, the compensator 16 includes a single interpolation function section 95, selectors 321 and 322, and a synthesis section 72.

The interpolation function section 95 includes interpolation execution sections 31a and 31b, a controller 90, a fundamental period calculator 92, a decoding result storage 93, a control switching section 96 and a state holder 97.

Regarding each constituent element, since the functions of the constituent elements with the same reference symbols as the constituent elements in FIG. 7 are the same as those in the fourth embodiment, their detailed description is omitted.

Further, a controller 90 corresponds to the above-described controller 71a or 71b, a fundamental period calculator 92 corresponds to the above-described fundamental period calculator 32a or 32b, and a decoding result storage 93 corresponds to the decoding result storage 323a or 323b. Therefore, a detailed description of these constituent elements is omitted.

However, the fifth embodiment differs from the fourth embodiment in the point that the controller 90, the fundamental period calculator 92 and the decoding result storage 93 function not only when the interpolation audio data TP1 and the fundamental period P1 are generated, but also when the interpolation audio data TP2 and the fundamental period P2 are generated.

In the fifth embodiment, since the decoding result storage 93 stores the decoding result IN1 which has passed through the interpolation execution section 31a in the normal state, when a transition to the loss compensation state is caused, the controller 90 can control the fundamental period calculator 92 to calculate a fundamental period P1 for generating the interpolation audio data TP1 and can generate the interpolation audio data TP1 in accordance with the calculated fundamental period P1. Moreover, in a case where an audio loss occurs in the succeeding frame section, various information necessary for generating the succeeding interpolation audio data TP1 is stored in a state holder 97 as generation state information Q1.

Next, the controller 90 can control the fundamental period calculator 92 to calculate a fundamental period P2 for generating the interpolation audio data TP2, and can generate the interpolation audio data TP2 in accordance with the fundamental period P2. For the purpose of the case where an audio loss occurs in the succeeding frame section, various information necessary for generating the succeeding interpolation audio data TP2 is stored in the state holder 97 as generation state information Q2.

The generation state information Q1 and Q2 can contain various information, which includes, for example, information indicating which portion of the decoding result DC stored in the decoding result storage 93 is used for generation of the current interpolation audio data TP1 and TP2.

After that, the controller 90 controls the control switching section 96 to actuate the interpolation execution section 31a in order to insert the generated interpolation audio data TP1 into a series of signals of an intermediate signal V1, and then controls the control switching section 96 to actuate the interpolation execution section 31b in order to insert the generated interpolation audio data TP2 into a series of signals of an intermediate signal V2.

Thereby, since the interpolation audio data TP1 and TP2 are supplied to the synthesis section 72 almost at the same time, the synthesis section 72 can give the weight factors α and β through the use of the fundamental period P1 and P2 which has already been supplied from the controller 90 and can output the synthesis result as an output audio signal V.

If a loss compensation state does not end for one frame and continues for a plurality of frames, voice loss compensation can continue by generation of the succeeding interpolation audio data TP1 and TP2 through the use of the generation state information Q1 and Q2 stored in the state holder 97

(E-2) Effect of Fifth Embodiment

According to the fifth embodiment, the same effects as those in the fourth embodiment can be obtained.

In addition, the fifth embodiment virtually realizes similar function to a case where two interpolation function sections are included by using a single interpolation function section (95) and thus it is quite possible to more effectively use storage resources and to reduce amount of computation.

(F) Other Embodiments

Although a compensator includes two interpolation function sections in the first to fourth embodiments described above, three or more interpolation function sections may be included in a compensator.

Further, although an interpolation function section includes two interpolation execution sections in the fifth embodiment described above, three or more interpolation execution sections may be included in an interpolation function section.

Furthermore, the features of the first to fifth embodiments described above can be used in arbitrary combinations, as far as no contradiction arises.

Moreover, although PCM encoding method is used in the first to fifth embodiments described above, the present invention is applicable to various encoding methods. For example, the present invention is applicable to a differential pulse code method such as ADPCM.

In addition, although the present invention in communication of audio signal through the use of a telephone system (VoIP phone system) is described as an example in the above first to fifth embodiments, the present invention is applicable to an audio signal other than an audio signal thorough a telephone system. For example, the present invention is widely applicable to communication, in which a periodical signal such as an audio signal and a tone signal is used.

Also, an applicable range of the present invention is not necessarily limited to a voice, a tone and the like. The present invention can be applied to an image signal such as a moving video image, for example.

If another encoding method is used or if an image signal or the like is used instead of an audio signal, as a matter of course, the details of the normal state, the loss compensation state, the normal transition operation, the loss transition operation and the like in the first to fifth embodiments described above can be correspondingly changed.

Further, as a matter of course, it is not necessary that communication protocol, to which the present invention is applied, is limited to the IP protocol described above.

In the above description, the present invention is realized mainly as a hardware, however the present invention can be realized mainly as a software.

What is claimed is:

1. A loss compensation device for compensating a loss in periodical signals when the loss occurs in an arbitrary section of the periodical signals which are divided into predetermined sections and received in time series, the loss compensation device comprising:
   a periodical signal storage which stores one or more sections of newly received periodical signals for a predetermined period of time;
   a loss detector which detects a loss of each section of the periodical signals; and
   an element periodical signal generator which generates a plurality of element periodical signals for interpolation having different waveforms, in accordance with the periodical signals stored in the periodical signal storage, at time of detection of the loss if the loss is detected by the loss detector;
   wherein the plurality of element periodical signals generated by the element periodical signal generator are synthesized, and a result of the synthesizing is arranged at the section where the loss in the periodical signals has occurred.

2. The loss compensation device according to claim 1, further comprising a plurality of interpolation handling sections, each including:
   an insertion execution section which inserts the element periodical signal into a series of the received periodical signals;
   the periodical signal storage; and
   the element periodical signal generator;
   wherein the series of the received periodical signals are supplied to each of the interpolation handling sections.

3. The loss compensation device according to claim 1, further comprising:
   a plurality of interpolation handling sections, each including an insertion execution section which inserts the element periodical signal into a series of the received periodical signals, the periodical signal storage, and the element periodical signal generator; and
   a supply controller which controls supplying of the series of the periodical signals to each of the interpolation handling sections;
   at least one of the plurality of interpolation handling sections being main interpolation handling section;
   the other of the plurality of interpolation handling sections being subsidiary interpolation handling section;
   wherein, when the loss in the periodical signal is not detected by the loss detector, the supply controller performs a control for supplying the series of the periodical signals to the main interpolation handling section, and when the loss in the periodical signal is detected by the loss detector, the supply controller performs a control for supplying the series of the periodical signals to the main interpolation handling section and the subsidiary interpolation handling section,
   wherein the main interpolation handling section causes a periodical signal storage of the subsidiary interpolation handling section to store one or more sections of the periodical signals that are stored in the periodical signal storage of the main interpolation handling section, thereby supporting generation of the element periodical signal by the subsidiary interpolation handling section.

4. The loss compensation device according to claim 1, further comprising:
   a factor controller which varies a value of a weight factor in accordance with a predetermined factor change rule, if each of the element periodical signal generators generates the element periodical signals having different waveforms in accordance with a predetermined weight factor.

5. A loss compensation method of compensating a loss in periodical signals when the loss occurs in an arbitrary section of the periodical signals which are divided into predetermined sections and received in time series, the method comprising the steps of:
   storing one or more sections of newly received periodical signals for a predetermined period of time, by a periodical signal storage;
   detecting a loss of each section of the periodical signals, by a loss detector;
   generating a plurality of element periodical signals for interpolation having different waveforms, by an element periodical signal generator, in accordance with the periodical signals stored in the periodical signal storage, at time of detection of the loss if the loss is detected by the loss detector; and
   synthesizing the plurality of element periodical signals generated by the element periodical signal generator to arrange a result of the synthesizing at the section where the loss in the periodical signals has occurred.

6. A loss compensation program stored on computer-readable storage medium for compensating a loss in periodical signals when the loss occurs in an arbitrary section of the periodical signals which are divided into predetermined sections and received in time series, the program allowing a computer to achieve:
   a periodical signal storage function of storing one or more sections of newly received periodical signals for a predetermined period of time;
   a loss detection function of detecting a loss of each section of the periodical signals; and
   an element periodical signal generation function of generating a plurality of element periodical signals for interpolation having different waveforms, in accordance with the periodical signals stored in the periodical signal storage, at time of detection of the loss if the loss is detected by the loss detector;
   wherein the plurality of element periodical signals generated by the element periodical signal generator are synthesized, and a result of the synthesizing is arranged at the section where the loss in the periodical signals has occurred.

* * * * *